United States Patent [19]
Gardner et al.

[11] Patent Number: 5,698,906
[45] Date of Patent: Dec. 16, 1997

[54] REMOTELY-CONTROLLED LOCKING SYSTEMS EMPLOYING A HOLOGRAPHIC DISPLAY

[75] Inventors: Anthony N. Gardner, Rancho Palos Verdes; Ronald T. Smith, Corona Del Mar, both of Calif.

[73] Assignee: Hughes Electronics, Los Angeles, Calif.

[21] Appl. No.: 536,896

[22] Filed: Sep. 29, 1995

[51] Int. Cl.$^6$ ............................................. G03H 1/26
[52] U.S. Cl. ...................... 307/9.1; 307/10.1; 340/461; 359/24; 359/23
[58] Field of Search ........................ 307/9.1–10.8; 340/459, 461, 542, 691, 425.5, 426, 457, 980; 362/61, 100, 80.1; 315/76, 77, 80, 84; 364/424.01, 424.05; 180/287; 359/22, 23, 24, 630

[56] References Cited

U.S. PATENT DOCUMENTS

| | | | |
|---|---|---|---|
| 4,754,255 | 6/1988 | Sanders | 180/287 |
| 4,790,613 | 12/1988 | Moss | 350/3.7 |
| 4,795,223 | 1/1989 | Moss | 340/980 |
| 4,892,369 | 1/1990 | Moss | 340/479 |
| 5,214,425 | 5/1993 | Wreede | 340/461 |
| 5,303,129 | 4/1994 | Hori | 362/80.1 |
| 5,333,071 | 7/1994 | Ishikawa | 362/80.1 |

*Primary Examiner*—Richard T. Elms
*Assistant Examiner*—Peter Ganjian
*Attorney, Agent, or Firm*—Leonard A. Alkov; Wanda K. Denson-Low

[57] ABSTRACT

A remote controlled locking system employing a holographic window display, particularly adapted for vehicle use. The system includes a remotely-operated transmitter for transmitting locking and unlocking signals, and a locking mechanism that is locked and unlocked in response to the transmitted signals. The locking mechanism outputs a status signal or status signals, corresponding to at least one of the locking and unlocking signals. Control electronics process the status signals from the locking mechanism to provide control signals that are coupled to first and second light emitting members, such as LED arrays. The light emitting members produce light output signals in response to the control signals. First and second prism couplers are attached to a surface of a window and are optically coupled to the first and second light emitting members. First and second hologram decals that comprise the holographic window display are attached to the surface of the window and are responsive to the light output signals. The first and second hologram decals respectively display first and second visible messages indicative of whether the locking mechanism is locked and unlocked. If only one status message is to be displayed, then the second set of components is not required, namely the second light emitting member, second input coupler, and second image hologram decal.

14 Claims, 1 Drawing Sheet

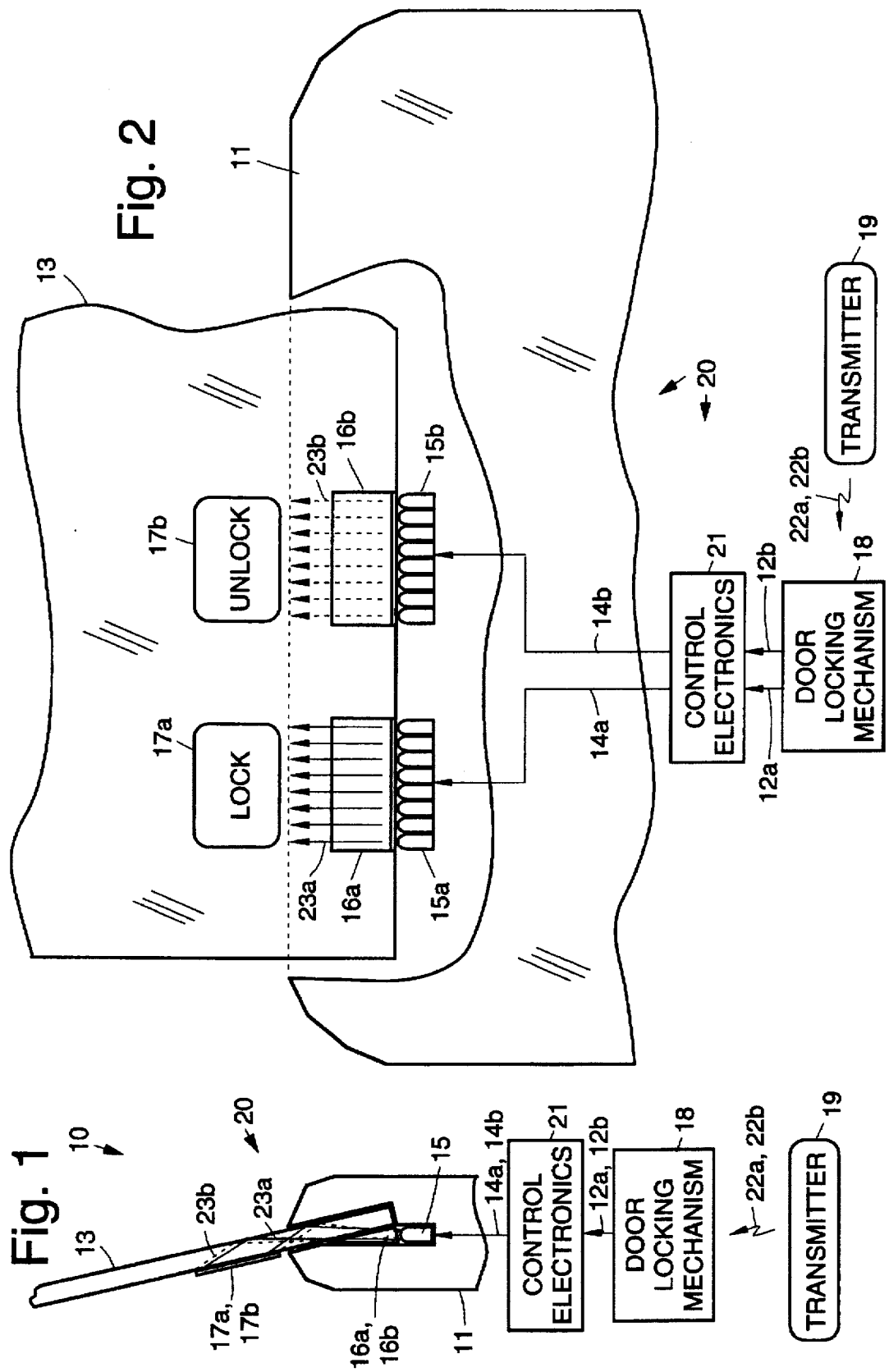

REMOTELY-CONTROLLED LOCKING SYSTEMS EMPLOYING A HOLOGRAPHIC DISPLAY

BACKGROUND

The present invention relates generally to door-locking systems, and more particularly, to a vehicle door-locking system having an improved visible holographic display indicator.

Many currently-available vehicles have door locking and unlocking mechanisms that can be activated by a signal transmitted by a radio or infrared transmitter attached to the driver's key chain. The majority of currently-available vehicles provide no verification that a key fob radio transmitter used by an operator of the vehicle has in fact locked or unlocked the door. Some cars use red and green lights that blink to indicate that the car door has been locked or unlocked, respectively.

On some cars it is possible to hear the door latch mechanism responding to the radio or infrared signal, which provides verification to the driver that his command was in fact received and executed. However, in noisy environments it is difficult to hear the movement of the door latch mechanism. Furthermore, on newer cars, the door locking and unlocking mechanisms are so quiet that it is difficult to hear them when they operate. The result is that drivers may typically hit the button once, twice, or three times until they are convinced their command was received and executed. This is a problem, not only because of inconvenience to the driver, but because the users of the radio or infrared transmitters are shorting their life due to switching them an average of three times per encounter, not one time as they were designed to be used.

It would be possible to connect the door locking and unlocking mechanism to a bell to provide auditory feedback. However, it is undesirable to have a bell go off every time one gets out of a car, since a proliferation of bell sounds from drivers getting out of their cars would be very annoying. If the volume of the bell were to be turned down to a barely audible level, then in a noisy environment, one would not hear it.

Thus there is a need for a visual, non-auditory means of verifying that a door locking and unlocking mechanism has responded to signals sent by a radio or infrared transmitter. Therefore, it is an objective of the present invention to provide for a remote controlled locking system having an improved visible holographic display indicator. It is a further objective of the present invention to provide a locking system for use in vehicles, and the like, that uses a visible holographic display indicator that is viewable by the operator of the vehicle when operating a remote transmitter used therewith.

SUMMARY OF THE INVENTION

To meet the above and other objectives, the present invention provides for a remote controlled locking system employing a holographic window display electronically linked to a remotely-controlled door locking and unlocking mechanism that displays the status of the locking mechanism. The remote controlled locking system comprises a remotely-operated transmitter for transmitting locking and unlocking signals. A locking mechanism is provided that is locked and unlocked in response to the locking and unlocking signals transmitted by the remote transmitter. The locking mechanism outputs first and second output signals corresponding to the locking and unlocking signals.

Control electronics are coupled to the locking mechanism for processing the first and second output signals to provide first and second control signals. First and second light emitting members are respectively responsive to the first and second control signals and provide first and second light output signals in response to the first and second control signals. First and second prism couplers are attached to a surface of a window, such as a vehicle window, for example, and that are optically coupled to the first and second light emitting members. First and second hologram decals that comprise the holographic window display are attached to the surface of the window and are respectively responsive to the first and second light output signals. The first and second hologram decals respectively display first and second visible messages indicative of whether the locking mechanism is locked or unlocked.

The holographic window display may be disposed on a driver's side window of a vehicle, for example, although other window locations may be used. Furthermore, the present door locking system may be used in non-vehicular applications as well, where remote transmitters are used to activate locking mechanisms. Although multiple messages may be typically displayed, it is only necessary to provide one set of components for displaying one message, such as a message indicating that the mechanism is locked, for example.

The holographic window display may be used with radio frequency and infrared transmitters, for example. In a vehicle application, when a button on a key fob radio or infrared transmitter is pressed to lock the door, a holographic image appears in the side window indicating that the door in fact has been locked. Likewise, when the button on the key fob is pressed to unlock the door, a second holographic image appears in the side window indicating that the door has been unlocked. Thus, the present invention provides for visual verification that the vehicle doors have been locked or unlocked.

The present invention thus provides a driver with visual verification that the key fob transmitter was in fact successful in locking or unlocking the vehicle doors. Because most vehicles provide no verification means whatsoever, the present invention is advantageous because it lets the driver know that the door is locked or unlocked. The present invention is thus beneficial for drivers of vehicles whose door locks are activated by key fob radio or infrared transmitters. The present invention may be used in all vehicles employing key fob radio or infrared transmitters.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a cross sectional side view of a remote controlled locking system in accordance with the principles of the present invention; and FIG. 2 illustrates a cutaway front view of the locking system of FIG. 1.

DETAILED DESCRIPTION

Referring to the drawing figures, FIG. 1 illustrates a cross sectional side view of a remote controlled locking system 10 in accordance with the present invention, and FIG. 2 illustrates a cutaway front view of the locking system 10. The present invention is described with reference to its use in a vehicle application. The remote controlled locking system 10 employs a holographic window display 20 linked electronically to a remotely-controlled door locking and unlocking mechanism 18. A typical remote controlled door locking system 10 is employed in a vehicle, for example.

The remote controlled locking system 10 comprises a remotely-operated transmitter 19 for transmitting locking and unlocking signals. The locking mechanism 18 is locked and unlocked in response to the locking and unlocking signals 22a, 22b transmitted by the remote transmitter 19. The locking mechanism 18 outputs first and second output signals 12a, 12b corresponding to the locking and unlocking signals 22a, 22b. Control electronics 21 are coupled to the locking mechanism 18 for processing the first and second output signals 12a, 12b and for providing first and second control signals 14a, 14b. First and second light emitting members 15a, 15b are respectively responsive to the first and second control signals 14a, 14b and respectively provide first and second light output signals 23a, 23b in response to the first and second control signals 14a, 14b.

First and second input couplers 16a, 16b, such as prism input couplers 16a, 16b, for example, are bonded with optical index-matching adhesive, for example, to a surface of a window 13, such as a vehicle window 13, for example, and are optically coupled to the first and second light emitting members 15a, 15b. First and second image hologram decals 17a, 17b that comprise the holographic window display 20 are attached to the surface of the window 13 and are respectively responsive to the first and second light output signals 23a, 23b. The first and second hologram decals 17a, 17b provide an indication of the status of the locking mechanism 18. More specifically, the first and second hologram decals 17a, 17b respectively display first and second visible messages (LOCK, UNLOCK) indicative of whether the locking mechanism 18 is locked or unlocked. However, it is to be understood that at least one visible message indicative of whether the locking mechanism 18 is locked or unlocked needs to be displayed. If only one message is to be displayed, then the second set of components is not required, namely the second light emitting member 15b, second input coupler 16b, and second image hologram decal 17b.

The present invention satisfies a need for a visual, non-auditory means of verifying that the door locking and unlocking mechanism 18 has responded to signals 22a, 22b sent by the transmitter 19. In operation, upon receiving a signal 12a, 12b from the door locking mechanism 18, the control electronics 21 sends a control signal 14a, 14b to either the first light emitting member 15a (LED array 15a) for the "LOCK" display or the second light emitting member 15b (LED array 15b) for the "UNLOCK" display and causes the particular LED array 15a, 15b to turn on. Light from the activated LED array 15a, 15b is edge-coupled by way of the appropriate prism coupler 16a, 16b into the window 13 wherein it totally internally reflects and is incident on the appropriate hologram decal 17a, 17b. The hologram decal diffracts light outwardly from the window 13 in the direction of the driver outside the vehicle. When the activated LED array 15a, 15b is turned off, the hologram decal 17a, 17b is transparent and nearly invisible, but when the LED array 15a, 15b is activated, the hologram decal 17a, 17b provides a bright viewable image.

The control electronics 21 may be designed so that the image is visible for a short period of time (10 seconds, for example) and then the activated LED array 15a, 15b is turned off making the image disappear. The control electronics 21 may also be designed to cause the image to flash with an appropriate duty cycle, if desired. Adapting the control electronics 21 to control the LED arrays 15a, 15b is well-understood in the art and will not be discussed in detail.

The holographic image produced by the hologram decals 17a, 17b may be either two-dimensional or three-dimensional. Reference is made to U.S. patent application Ser. No. 08/537,176, filed Sep. 29, 1995, entitled "Holographic Information Display for Exterior Vehicle Applications", assigned to the assignee of the present invention, which describes two-dimensional or three-dimensional image display holograms that may be used in the present invention.

Thus, an improved remote controlled locking system having a visible holographic display indicator has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A remote controlled locking system comprising:
 a transmitter for transmitting locking and unlocking signals;
 a locking mechanism that is locked and unlocked in response to the locking and unlocking signals transmitted by the transmitter, and which outputs first and second output signals corresponding to the locking and unlocking signals;
 control electronics coupled to the locking mechanism for processing the first and second output signals and for providing first and second control signals in response thereto;
 first and second light emitting members that are respectively responsive to the first and second control signals and which respectively provide first and second light output signals in response to the first and second control signals;
 first and second input prism couplers affixed to a surface of a window and that are optically coupled to the first and second light emitting members; and
 first and second hologram decals affixed to the surface of the window that are respectively responsive to the first and second light output signals, that respectively display a visible message indicative of the status of the locking mechanism.

2. The system of claim 1 wherein the first and second hologram decals comprise reflection holograms.

3. The system of claim 1 wherein the first and second hologram decals comprise two-dimensional holograms.

4. The system of claim 1 wherein the first and second hologram decals comprise three-dimensional holograms.

5. The system of claim 1 wherein the first and second light emitting members comprise first and second light emitting diode arrays.

6. The system of claim 1 wherein the transmitter comprises a radio frequency transmitter.

7. The system of claim 1 wherein the transmitter comprises an infrared transmitter.

8. A remote controlled locking system comprising:
 a transmitter for transmitting locking and unlocking signals;
 a locking mechanism that is locked and unlocked in response to the locking and unlocking signals transmitted by the transmitter, and which outputs a status signal corresponding to one of the locking and unlocking signals;

control electronics coupled to the locking mechanism for processing the status signal and for providing a control signal in response thereto;

a light emitting member that is responsive to the control signal and which provides a light output signal in response to the control signal;

an input prism coupler affixed to a surface of a window and that is optically coupled to the light emitting member; and a hologram decal affixed to the surface of the window that is responsive to the light output signal, that display a visible message indicative of the status of the locking mechanism.

9. The system of claim 8 wherein the hologram decal comprises a reflection hologram.

10. The system of claim 8 wherein the hologram decal comprises a two-dimensional hologram.

11. The system of claim 8 wherein the hologram decal comprises a three-dimensional hologram.

12. The system of claim 8 wherein the light emitting member comprises a light emitting diode array.

13. The system of claim 8 wherein the transmitter comprises a radio frequency transmitter.

14. The system of claim 8 wherein the transmitter comprises an infrared transmitter.

* * * * *